(12) United States Patent
Ashiwa

(10) Patent No.: US 7,330,321 B2
(45) Date of Patent: Feb. 12, 2008

(54) REFERENCE MAGNETIC SIGNAL RECORDING DEVICE AND METHOD OF MANUFACTURING THE SAME

(75) Inventor: Jun Ashiwa, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 509 days.

(21) Appl. No.: 10/886,909

(22) Filed: Jul. 8, 2004

(65) Prior Publication Data
US 2005/0013043 A1    Jan. 20, 2005

(30) Foreign Application Priority Data
Jul. 14, 2003    (JP)    ............... 2003-196458

(51) Int. Cl.
*G11B 5/09*    (2006.01)
(52) U.S. Cl. ............... 360/48; 360/49; 360/51; 360/55; 360/125; 360/77.02
(58) Field of Classification Search ............... 360/48, 360/51, 75, 77.08, 77.12, 77.14, 121, 122, 360/125, 274
See application file for complete search history.

(56) References Cited

U.S. PATENT DOCUMENTS

| | | | | |
|---|---|---|---|---|
| 5,379,166 A | * | 1/1995 | Tsukada et al. | ........... 360/78.14 |
| 5,644,457 A | * | 7/1997 | Llewellyn et al. | ........... 360/121 |
| 5,757,573 A | * | 5/1998 | Tokuyama et al. | ............ 360/75 |
| 6,204,991 B1 | * | 3/2001 | Karube | .................... 360/78.04 |
| 6,243,223 B1 | * | 6/2001 | Elliott et al. | ............. 360/77.08 |
| 6,507,450 B1 | * | 1/2003 | Elliott | ..................... 360/77.08 |
| 2003/0021051 A1 | * | 1/2003 | Suzuki et al. | ................. 360/53 |

* cited by examiner

*Primary Examiner*—Andrea Wellington
*Assistant Examiner*—Carlos E Garcia
(74) *Attorney, Agent, or Firm*—Morgan & Finnegan, L.L.P.

(57) ABSTRACT

A method of simultaneously recording multiple reference magnetic signals by using a magnetic head having multiple recording portions is provided. A writing yoke formed of a ferromagnetic material thin film and a back yoke are provided to a side wall of a slider, which is formed of a hard ceramic, as a distal end portion of the magnetic head. After forming the yokes to the slider, grooves are formed by focused ion beam machining from the slider side. All of the materials of the slider, the back yoke, and the writing yoke are thus locally removed. Magnetic writing is thus blocked by the grooves, and magnetic recording is only performed by four recording portions of the writing yoke.

4 Claims, 2 Drawing Sheets

REFERENCE MAGNETIC SIGNAL RECORDING DEVICE AND METHOD OF MANUFACTURING THE SAME

BACKGROUND OF THE INVENTION

1. Field of the Invention

The present invention relates to a device that writes a reference magnetic signal for track positioning onto a high density magnetic recording medium such as a hard disk. In particular, the present invention relates to a device in which the writing time for the reference magnetic signal is reduced.

2. Related Background Art

A reference magnetic signal for track positioning is recorded in advance on a high density magnetic recording medium such as a hard disk.

In the past, recording of the reference magnetic signal for track positioning has been performed after the disk is inserted in a drive, with a head arm positioned by a pushpin that is provided in an external position. In recent years, however, it is getting harder to use this method to record a reference signal with precision high enough to satisfy requirements. This is due to restrictions in track mechanism precision, rigidity, and the like that accompany increased track density.

A method of writing the reference signal by using a high-precision, high-rigidity spin stand before incorporating the disk into the drive has been employed recently as a high density reference signal recording technique.

However, there is a problem in that costs related to writing the reference signal increase because devices that implement this method are expensive, in particular, because recording a reference signal that corresponds to a high track density requires a long period of time.

SUMMARY OF THE INVENTION

In order to solve the problems described above, an object of the present invention is to provide a reference magnetic signal recording device and a method of manufacturing the same. The reference magnetic signal recording device according to the present invention records a reference magnetic signal corresponding to a radial position on a recording medium composed of a magnetic disk by using a magnetic head. The magnetic head has a plurality of recording portions in a radius direction.

Further, the present invention provides a method of manufacturing a reference magnetic signal recording device which has a magnetic head configured by a single recording means having a surface that opposes a recording medium, on which a recording blocking portion including one or more grooves is formed to form a plurality of recording portions in a radius direction, in a part that opposes the recording medium, the method including forming at least main portions of the magnetic head having a recording width that extends across the plurality of recording portions and partially grooving the surface that opposes the recording medium to form the recording blocking portion.

Other objects and configurations relating to the present invention will become clear upon reading the description of embodiments discussed hereinafter.

DESCRIPTION OF THE PREFERRED EMBODIMENTS

Figure 1:
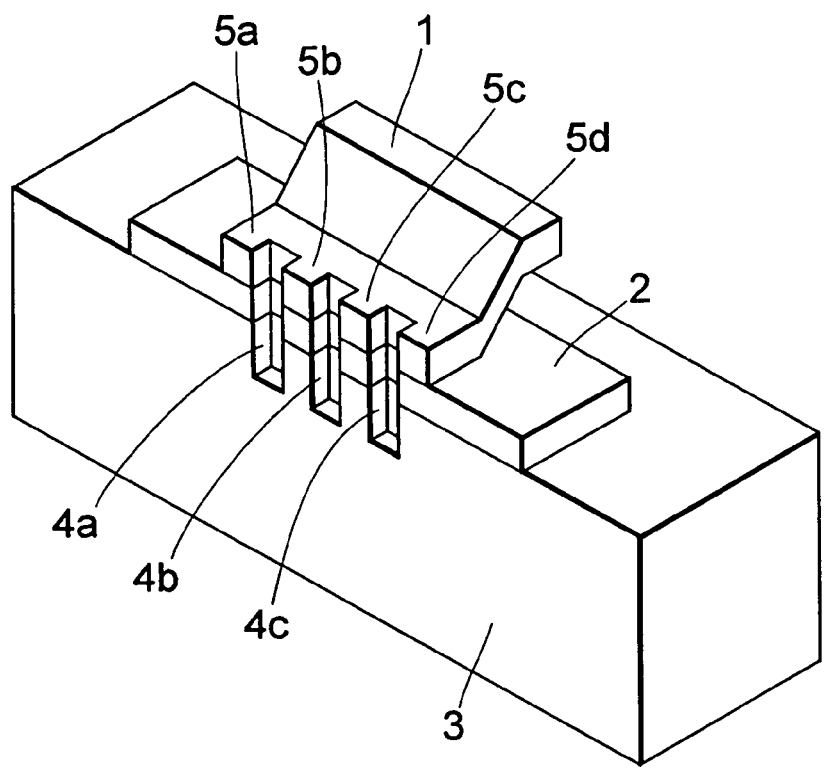
FIG. 1 is a schematic diagram showing a structure of a distal end portion of a magnetic head.

The problems described above are solved by writing a reference magnetic signal by using a magnetic head according to the present invention, the magnetic head having a plurality of recording portions in a track transverse direction. The magnetic head is formed of the recording portions obtained by grooving a recording portion of a wide magnetic head through focused ion beam (FIB) machining or other such methods, to partially block magnetic recording. For example, if a magnetic head provided with N recording portions at a pitch P is used, it is possible to write N reference magnetic signals by one writing operation, and the writing time can be reduced to 1/N.

In general, the diameter of a magnetic disk is several centimeters, and the width of the recording portions is from several millimeters to a width that, when stated in millimeters, runs in the teens. In contrast, the recording width of a magnetic head is several hundreds of micrometers, even for wide magnetic heads.

Accordingly, it is necessary to repeat recording while changing a radial position for writing the reference magnetic signal onto an entire recording region. For the magnetic head described above in which the N recording portions are provided at the pitch P in the radius direction, it is possible to record the reference magnetic signals at the pitch P throughout the entire recording region of the magnetic disk by repeatedly changing the diameter by an amount NP after completion of one-round reference magnetic signal recording, and then recording the reference magnetic signal for the next round.

The reference magnetic signal is generally recorded in a format generally referred to as a burst signal, and it is preferable to configure the reference magnetic signal by using a plurality of burst signals. In this case, it is preferable to set signal phases in a track direction so that a first burst signal and a second burst signal have inverse phases. Offset variation can thus be canceled out. Furthermore, it is preferable to provide a third burst signal having a phase that differs from that of the first burst signal by 90 degrees because detection of movement direction becomes possible, and the position measuring precision is improved. In order to cancel out offset variation with the third burst signal, it is preferable to provide a fourth burst signal having the inverse phase of the third burst signal.

The reference magnetic signals composed of the four burst signals may be provided over the entire surface area of the disk. However, it is preferable to provide the reference magnetic signals intermittently at equal intervals in a rotational direction in order to make clear distinctions between data recording regions and reference magnetic signal regions.

The reference magnetic signal may be recorded in concentric circles, and it is also possible to record the reference magnetic signal in a helical shape. Recording the reference magnetic signals in concentric circles requires some time for moving the magnetic head after recording is complete at each radial position. However, movement of the magnetic head is performed concurrently with signal recording when recording the signals in a helical shape, and the amount of time necessary for moving the magnetic head can be reduced. Further, helical recording also has an advantage in that there are no unavoidably generated seams with concentric recording, and the precision of position control performed by using the recorded reference magnetic signal is improved.

When a plurality of burst signals are recorded in a helical shape, the first burst signal is recorded over an entire radial range of the recording region, and then the second burst signal is recorded. By recording the signals in this manner, each of the burst signals can be recorded in succession over the entire radial range of the recording region, and any error such as step-like misalignment at seams between recording portions can be avoided.

When recording the reference magnetic signal in a helical shape, for example, by using the magnetic head in which the N recording portions are provided at the pitch P, the reference magnetic signal can be recorded on the entire recording region, provided that the magnetic head is moved uniformly so that the radial length is changed by an amount corresponding to NP per revolution.

Further, it is also possible to curtail and record the reference magnetic signals. For example, the reference magnetic signal can be recorded to a region that is half of the recording region if the magnetic head is moved uniformly so that the radial length is changed by 2NP per revolution. This reduces the writing time by half. There is a possibility that this type of magnetic signal will become undetectable, depending upon the movement speed of the magnetic head. However, if a process of rewriting the reference magnetic signal after drive assembly is included, processing can be performed to avoid movement of the magnetic head at a speed where the reference magnetic signal will become undetectable.

A magnetic disk from which signals are erased in advance may also be attached to a reference magnetic signal recording device and the reference magnetic signal is written onto the magnetic disk. However there is a possibility that localized magnetization will develop during handling of the magnetic disk. Accordingly, it is preferable to erase the signals immediately before recording.

To that end, it is preferable to provide a second magnetic head to the reference magnetic signal recording device in addition to a first magnetic head having a plurality of recording portions for performing initialization immediately before recording the reference magnetic signals. The second magnetic head has a recording width that is equivalent to, or is wider than, a recording width of the first magnetic head (P in the above example). It is possible to perform the initialization by magnetizing it in one direction, or by writing an alternating current signal. In the latter case, the reference magnetic signal is formed by locally erasing an initially written signal by using the second magnetic head.

In addition to the burst signals used for precise positioning, a clock signal, a pattern for identifying sector addresses, a pattern for identifying track addresses, and the like may generally be written as a control signal written onto the magnetic disk. It is also possible to use the second magnetic head to write those signals.

The second magnetic head has a recording width over a plurality of tracks, and it is difficult to record a pattern for identifying track addresses that identify individual tracks.

By performing helical recording, however, the pattern for identifying track addresses is changed at any position in one revolution. By referencing the sector addresses at that position, it becomes possible to identify the positions of individual tracks. In addition, recording the signals in a plurality of helical shapes with the second magnetic head is preferable because the pattern for identifying the track addresses in one revolution changes a plurality of times, and it becomes possible to identify individual tracks a plurality of times in one revolution.

FIG. 1 is a diagram for explaining the structure of a distal end portion of a magnetic head according to an embodiment used in a reference magnetic signal recording device. FIG. 1 schematically shows a state where a writing yoke 1, which is formed of a ferromagnetic material thin film, and a back yoke 2 are provided on a side wall of a slider 3 that is formed of a hard ceramic. It should be noted that, although a magnetic head to which only four recording portions are provided is shown in FIG. 1 as an example, in practice, a magnetic head having from several tens to several hundred recording portions is used.

After providing the writing yoke 1 and the back yoke 2 to the slider 3, grooves 4a, 4b, and 4c are formed by FIB machining from the slider 3 side. All of the materials of the slider 3, the back yoke 2, and the writing yoke 1 are thus removed locally. Magnetic writing is blocked by the grooves 4a and 4b, and magnetic recording is only effected at four recording portions 5a, 5b, 5c, and 5d of the writing yoke 1.

Figure 2:
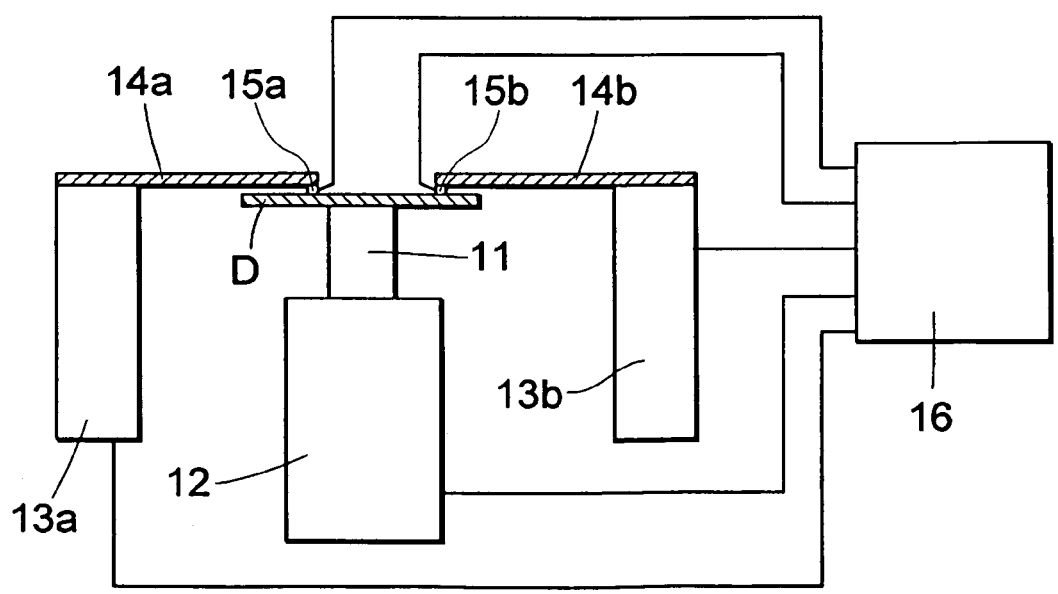
FIG. 2 is a diagram showing an overall configuration of a reference magnetic signal recording device.

FIG. 2 is a configuration diagram of a reference magnetic signal recording device for recording a reference magnetic signal on a magnetic disk D. The magnetic disk D for recording is chucked by a chuck mechanism 11, and the chuck mechanism 11 is driven by an air spindle motor provided with a precision encoder. Head arms 14a and 14b are fixed to head arm moving mechanisms 13a and 13b, respectively. Magnetic heads 15a and 15b are attached to distal ends of the head arms 14a and 14b, respectively. The magnet heads 15a and 15b are disposed in close proximity to a surface of the magnetic disk D. The air spindle motor 12, the head arm positioning devices 13a and 13b, and the magnetic heads 15a and 15b are connected to a controller 16, and operated by commands from the controller 16. The magnetic head 15a has the plurality of recording portions shown in FIG. 1, while the magnetic head 15b does not have grooves, thus forming a wide magnetic head with which magnetic recording is performed across the entire width of the writing yoke 1.

Figure 3:
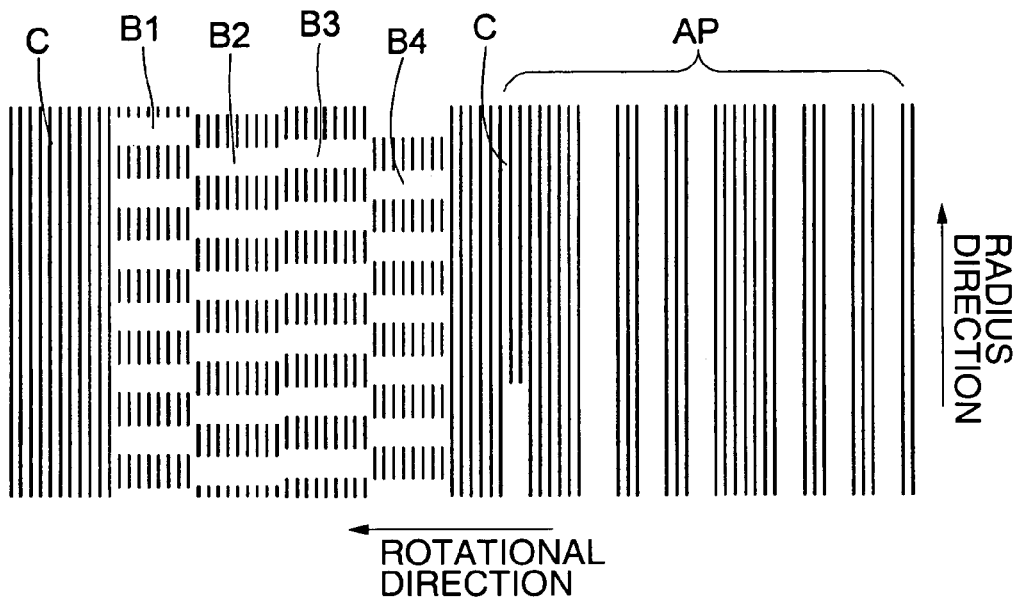
FIG. 3 is a diagram showing a recorded reference magnetic signal.

FIG. 3 shows a reference magnetic signal that is recorded by the reference magnetic signal recording device. The reference magnetic signal can be generated by a known device that sends a signal to the magnetic heads 15a and 15b, based on a signal from the precision encoder that is mounted to the air spindle motor 12, while the controller 16 controls the head arm positioning devices 13a and 13b. Writing of the reference magnetic signal is performed by recording an alternating current signal onto the entire recording region with the wide magnetic head 15b, and then erasing the recorded signal only at predetermined portions with the magnetic head 15a having the plurality of recording portions.

In FIG. 3, four burst signals of a first burst signal B1, a second burst signal B2, a third burst signal B3, and a fourth burst signal B4 are recorded so that their phases mutually differ by 90 degrees in a track transverse direction. A clock signal C is recorded throughout portions ahead of portions where the burst signals B1, B2, B3, and B4 are recorded, in a rotational direction. In the case of using the reference signal for the control, clock generator transmitters within the controller 16 is operated in synchronization with the clock signal C. Further, a pattern AP for identifying addresses is recorded by the magnetic head 15b in portions behind those where the four burst signals B1, B2, B3, and B4 are recorded in the rotational direction. The pattern AP is used as a rough signal that shows which position the magnetic head is in within the entire recording region.

The minimum resolution of a single track address signal corresponds to one writing width NP. For cases where the magnetic head 15a possesses N recording portions, the same track address signal is recorded in track positions in N periods. For cases where helical signal recording is performed, however, the position at which the magnetic head is located in the N periods can be determined by reading the positions at which the track address signal changes in one revolution.

Figure 4:
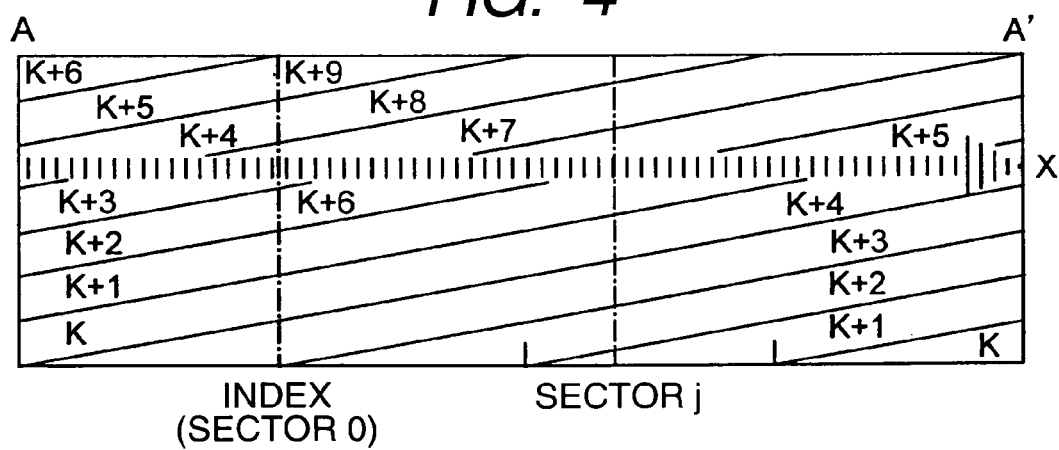
FIG. 4 is a diagram for explaining a pattern used to identify track addresses.

FIG. 4 is a diagram for explaining an arrangement example of the pattern AP for identifying the track address and a principle of identifying a specific track. A left end A' denotes the same angular position as a right end A. The pattern AP for identifying the track address is one in which identical signals k to k+9 are recorded across the width NP. Addresses are allocated in values that increase by the number of helixes (four in this embodiment) at angular positions corresponding to a sector 0 index.

The track address changes from k+6 to k+5 in a sector j position for cases where the magnetic head passes through an arrow X position shown in a center portion of FIG. 4. Provided that this change is detected, a value calculated by adding 4 j/m to a track address value in the index position can be obtained as a value that corresponds to a reading radial position, where m is the total number of sectors. It should be noted that the track address values in the index position are values obtained by adding an integer portion of 4 j/m to the track address value read at each position.

It should also be noted that the following problem develops in recording of a final helix for cases of recording the track addresses in a plurality of helical shapes by using the magnetic head 15b having a wider writing width than the recording width. The problem is one in which the track addresses recorded by the first helix are partially erased. In this case, it is preferable to determine the track address by the track addresses at prior- and subsequent-rotation positions and by the amount of movement of the magnetic head defined from the burst signals, without recording the track address, for recording of the final helix.

An "Air Spindle model SP-5083K" manufactured by Canon Inc. is used for the spindle motor 12, and a "Rotary Positioners KPaM10" manufactured by Canon Inc. is used for the head arm moving mechanisms 13a and 13b. A "Next Generation Servo Track Writer model SW1650" manufactured by Canon Inc. can be used as a highly rigid base upon which the spindle moving 12 and the head arm moving mechanisms 13a and 13b are disposed.

Spaces between a rotation center of the air spindle motor 12 and rotation centers of the head arms 14a and 14b, and spaces between the recording positions of the magnetic heads 15a and 15b and the rotation centers of the head arms 14a and 14b are set to match drive specifications.

The magnetic head 15a having the plurality of recording portions is formed by leaving 0.15 µm-recording portions at 50 locations at a pitch of 0.3 µm by focused ion beam machining on a magnetic head having a recording width of 15 µm. The same type of magnetic head having a recording width of 15 µm is used as is, without grooving the magnetic head, for the wide magnetic head 15b. The controller 16 is configured by a known technique, and a personal computer is used for the overall control.

Figure 5:
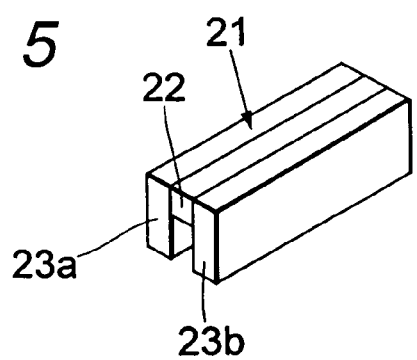
FIG. 5 is a diagram for explaining an initialization device (eraser) that uses a permanent magnet.

An example of recording the reference magnetic signal on the magnetic disk D, which is erased in advance using a direct current, by the magnetic head 15a having the plurality of recording portions is discussed as a first embodiment of the present invention. First, the magnetic disk D is attached to the spindle motor 12 and rotated. An initialization device 21 shown in FIG. 5 approaches and leaves the surface of the magnetic disk D in this state, so that the entire surface of the magnetic disk D is uniformly magnetized. The initialization device 21 is also referred to as an eraser (erasing device), and is configured by a permanent magnet 22 that is sandwiched by two yokes 23a and 23b that have high magnetic permeability. The initialization device 21 possesses a function of generating a magnetic field in a distal end portion thereof. The characteristics and shape of the permanent magnet 22 are selected to that the intensity of the magnetic field generated in the distal end portion is equal to or greater than 2 to 3 times the reluctance of the magnetic disk D. The entire magnetic disk D undergoes uniform and complete saturation magnetization by placing the magnetic disk D close to the initialization device 21.

Next, the magnetic head 15a is positioned at one end of the recording radius. Writing is performed by applying a writing signal from the controller 16 to the magnetic head 15a, the writing signal being in synchronization with a signal of the encoder in the spindle motor 12. The position in the radius direction of the magnetic head 15a is determined by the head arm moving mechanism 13a and the head arm 14a, which are controlled by the controller 16. The controller 16 controls the head arm moving mechanism 13a and the writing signal to the magnetic head 15a so that the target reference magnetic signal is recorded on the magnetic disk D.

A magnetic colloid is applied to the entire surface of the magnetic disk D after recording the four burst signals (B1 to B4) shown in FIG. 3 by using this method. A magnetic pattern that corresponds to the target signal has been verified by microscopic observation of the magnetized state of the surface of the magnetic disk D.

Next, an example in which the reference magnetic signal is recorded by writing a signal using the wide magnetic head 15b, and then partially erasing the records by using the magnetic head 15a having the plurality of recording portions is discussed as a second embodiment of the present invention. Only one head arm moving mechanism 9 is provided to the "Next Generation Servo Track Writer model SW1650" manufactured by Canon Inc. Accordingly, a first "Servo Track Writer" to which the wide magnetic head 15b is attached, and a second "Servo Track Writer" to which the magnetic head 15a having the plurality of recording portions is attached are used. After performing signal recording by using the wide magnetic head 15b attached to the first "Servo Track Writer", the magnetic disk D is transferred to the second "Servo Track Writer", and signal recording is performed by using the magnetic head 15a having the plurality of recording portions.

It should be noted that adjustments are necessary for making the center positions of the signals recorded by the wide magnetic head 15b coincide with the center positions of the signals recorded by the magnetic head 15a with this method. It is preferable to write both signals without re-mounting the magnetic disk D by using the "Servo Track Writer" having the two head arm moving mechanisms (13a and 13b), for commercial reference magnetic signal writing.

It has been verified that, as a result of writing each of the signals shown in FIG. 3 by using this device, a regenerative signal corresponding to position can also be obtained from the magnetic disk D on which any of the reference magnetic signals is recorded. Further, the amount of time necessary for writing is reduced to approximately 1/100 of that needed for writing with a conventional method.

The reference magnetic signal recording device according to the present invention enables simultaneous recording of a plurality of reference signals by a magnetic head having a plurality of recording portions as explained above. The amount of time necessary for recording the reference magnetic signals can be considerably shortened, and the cost of manufacturing the high density magnetic recording device can be reduced.

Further, with the method of manufacturing a reference magnetic signal recording device according to the present invention, a magnetic head having a plurality of recording portions can be obtained by forming a recording blocking portion composed of one or more grooves on a surface opposite to a recording medium of a single recording means.

What is claimed is:

1. A reference magnetic signal recording device comprising:
   holding means for holding a magnetic disk;
   a first magnetic head for recording a reference position signal on the magnetic disk; and
   magnetic head position moving means for moving a position of the first magnetic head to a reference position signal writing position of the magnetic disk,
   wherein the first magnetic head has a plurality of recording portions in a radius direction,
   further comprising a second magnetic head having a single recording part, wherein:
   a recording width of the second magnetic head is made equal to, or greater than, a recording width of the first magnetic head; and
   signal writing that differs from signal recording with the first magnetic head is performed by using the second magnetic head before the signal recording is performed by using the first magnetic head.

2. A reference magnetic signal recording device according to claim 1, wherein the second magnetic head writes an alternating current signal, and the first magnetic head writes a direct current signal, erasing the recording signal of the second magnetic head.

3. A reference magnetic signal recording device according to claim 2, wherein:
   the second magnetic head further performs recording in the rotational direction to a region outside a writing region of the first magnetic head; and
   the recording includes recording one of a clock signal, a pattern for identifying a rotational-direction address, and a pattern for identifying a radius direction-address or all of the patterns.

4. A reference magnetic signal recording device according to claim 1, wherein the second magnetic head helically records the pattern for identifying the radius-direction address.

* * * * *